(12) United States Patent
Fair

(10) Patent No.: US 6,628,307 B1
(45) Date of Patent: Sep. 30, 2003

(54) USER INTERFACE FOR INTERNET APPLICATION

(76) Inventor: Ronald J. Fair, 161 Willow Creek La., Danville, CA (US) 94506

( * ) Notice: Subject to any disclaimer, the term of this patent is extended or adjusted under 35 U.S.C. 154(b) by 0 days.

(21) Appl. No.: 09/432,924

(22) Filed: Nov. 3, 1999

(51) Int. Cl.[7] .................................................. G09G 5/00
(52) U.S. Cl. ..................................... 345/763; 345/805
(58) Field of Search ................................ 705/1, 14, 26, 705/27; 707/10, 501.1, 513; 709/217, 219; 345/721, 836, 839, 848, 763, 764, 765, 805, 804

(56) References Cited

U.S. PATENT DOCUMENTS

| | | | | |
|---|---|---|---|---|
| 5,805,819 | A | | 9/1998 | Chin et al. ............. 395/200.54 |
| 5,896,533 | A | | 4/1999 | Ramos et al. ................ 395/680 |
| 5,905,973 | A | * | 5/1999 | Yonezawa et al. ............. 705/1 |
| 5,918,239 | A | * | 6/1999 | Allen et al. .................. 707/526 |
| 5,930,474 | A | * | 7/1999 | Dunworth et al. ............ 707/10 |
| 5,930,501 | A | | 7/1999 | Neil ............................ 395/551 |
| 5,931,908 | A | | 8/1999 | Gerba et al. ................. 709/219 |
| 5,933,140 | A | | 8/1999 | Strahorn et al. ............ 345/338 |
| 5,933,141 | A | | 8/1999 | Smith .......................... 345/339 |
| 5,933,599 | A | | 8/1999 | Nolan .................... 395/200.48 |
| 5,970,471 | A | * | 10/1999 | Hill .............................. 705/26 |
| 6,336,100 | B1 | * | 1/2002 | Yamada ........................ 705/26 |
| 6,346,956 | B2 | * | 2/2002 | Matsuda ..................... 345/836 |
| 2002/0010623 | A1 | * | 1/2002 | McCollom et al. ........... 705/14 |

OTHER PUBLICATIONS

WAL–MART, http://www.wal–mart.com and links, 6 Internet pages, Sep. 13, 1999.
CitySearch, http://www.citysearch.com and links, 9 Internet pages, Sep. 13, 1999.
iVillage.com, http://www.ivillage.com and links, 6 Internet pages, Sep. 13, 1999.
Le Village, http://www.levillage.com/cgi–bin/levillagecom-.storefront/1116732644/Catalog, 1 Internet page, Sep. 17, 1999.
Candy Stores, http://www.mallbusters.com/candy_stores.htm, 1 Internet page, Sep. 17, 1999.

* cited by examiner

Primary Examiner—John Cabeca
Assistant Examiner—Tadesse Hailu

(57) ABSTRACT

A graphical user interface arranged according to buildings commonly found in a town. A number of icons representing buildings are displayed, the buildings being arranged in a fashion according to a generic town to create the village map. When a user, such as an on-line shopper, selects a building, a sub-menu of provider sites is shown on a display. The provider sites are logically related to the selected building. In a further embodiment, the user can select goods or services from several different provider sites from one or more buildings, placing each of the selections into an electronic shopping cart and paying for all selections with a single command.

11 Claims, 6 Drawing Sheets

SHOPPING MALL
Stereo Equipment
Video Equipment
Cameras
Computer Store
Beauty Salon
Kitchen/Bath Products
Clothes/Shoes TRAVEL SERVICES
Travel Agency
Local Airport/Airlines
Cruises
Trains
Buses MOTEL
Local Motels/Hotels
Restaurants GIFT SHOP
Florists
Candy
Gift Baskets
Crafts FINANCIAL SERVICES
Banking
Financial Planning
Stock Broker
On-line Trading
Loan/Credit Companies
insurance Companies
Market Reports REAL ESTATE
Local Sales Office
Rental Agencies
Real Estate Loans
Appraisers
Inspectors
Property Management GROCERYSTORE
Grocery Delivery
Assembly for Pick-up
Florist
Pharmacy ENTERTAINMENT
On-line movies(sales)
Theater Schedules
Television Programs
On-line gaming
Sports Information
Local Events
Ticket Sales CHILDREN'S STORE
Clothes
Toys
Furniture
Educational Games
Books HOME FURNISHINGS
Furniture
Lighting
Kitchen Equipment AUTO
Parts Sales/Delivery
Vehicle Rental
Sales
Insurance
Advertising PROFESSIONAL
Hospital Information
Doctor Appointments
Dentist Appointments
Veterinarian
    Appointments
Chiropractors
    Appointments
Attorneys
Accountants TOWN HALL
Listing of Representatives
  Local
  State
  National BUILDING EMPORIUM
Hardware
Building Supplies
Garden Supplies
Nursery Plants
Rental Equipment SCHOOLS
Locations
Entrance Requirements
Testing Programs
Learning Materials
Books
Loans SALOON
On-line sex
Package Liquor
On-line Gambling NEWSTAND
Headlines
Late-Breaking News
Sports
Finance
Stock Report
Magazines HEALTH & PHARMACY
Drugs
Health Foods
Magazines
Advice EMPLOYMENT & MOVING
Moving and Storage
Rental Agency
Relocation Services

*FIG. 1*

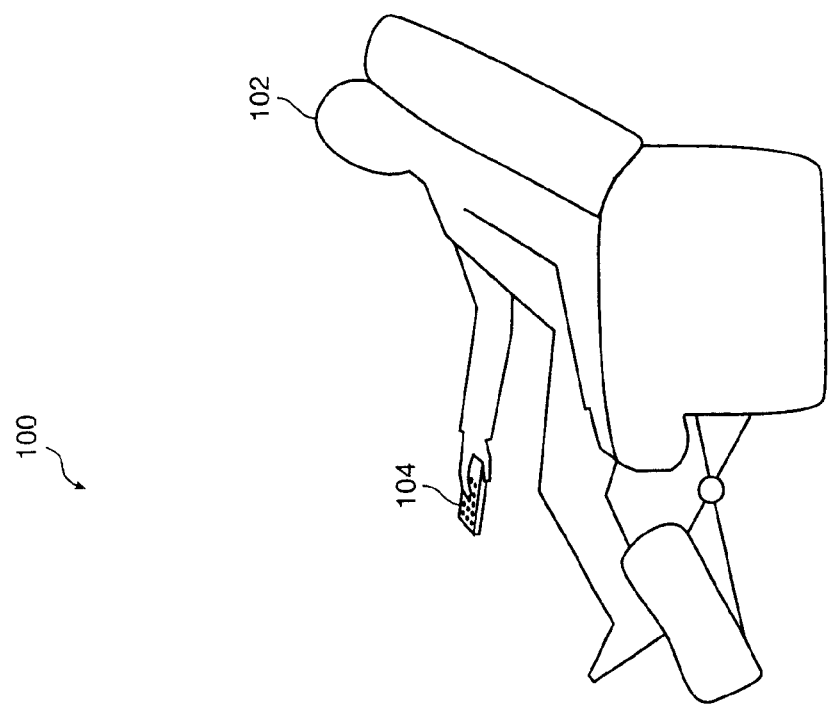
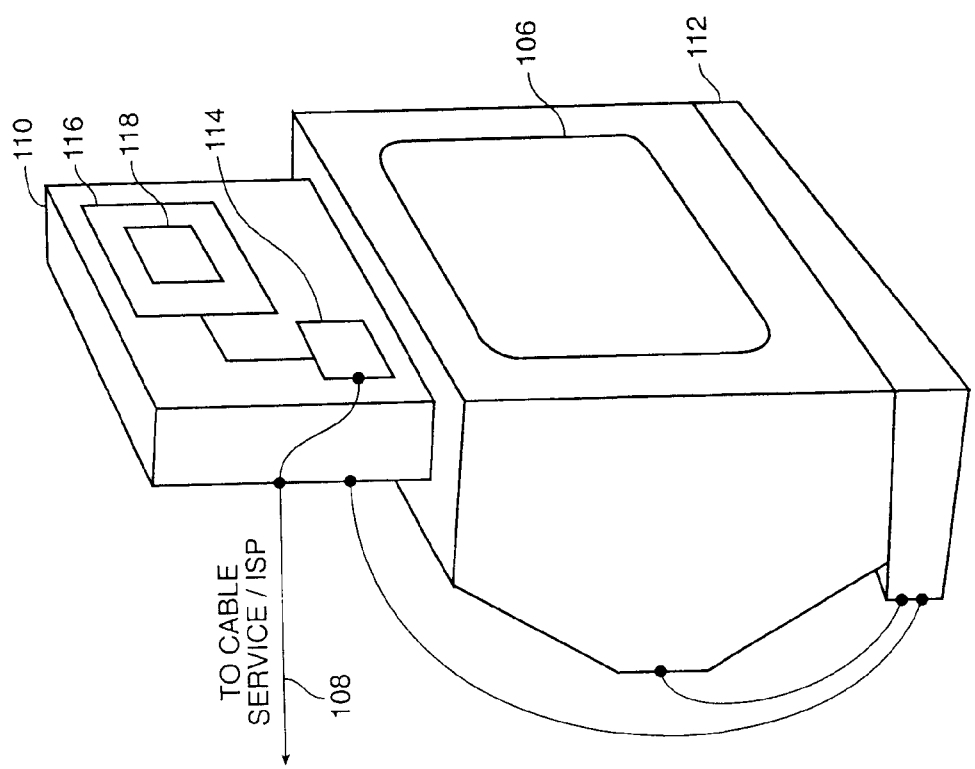
FIG. 2

USER INTERFACE FOR INTERNET APPLICATION

BACKGROUND OF THE INVENTION

The invention relates generally to networked computer systems, and more particularly to a graphical user interface for use with an on-line shopping and information service.

The development of broad-based networked computer systems, such as the Internet and the World-Wide Web (the "web"), provide a user, such as an individual consumer, opportunities to access a seemingly limitless variety of goods, services, and information. However, finding exactly what one wants on such a network can be a daunting and frustrating task. The growth of these systems, while providing access to an expanding body of information, can also confound a user looking for particular information.

Conventional solutions to finding desired web sites, typically identified by a universal resource locator ("URL") use search engines or similar methods. A user typically enters a term or key word (or words) associated with what the user was looking for, often as a Boolean string, and the search engine performs a search for the identified terms. The process may be speeded up by having the search engine search a string of characters or terms associated with the URL, rather than the entire site. The associated terms, and hence the results of the search, depend on who chose the terms. Thus, the number of sites, or "hits", returned by a search engine is often unwieldy and contains a number of sites not related to the user's desired result. The number of irrelevant sites can often be limited with a more comprehensive search request, but this usually requires some knowledge about Boolean logic, definition of search strings, the terms that might be associated with a URL, and preferably some idea as to how the search engine will perform the search.

Such understanding of computer search techniques is often beyond the experience of casual computer users, who may just want to go on-line to quickly to perform a specific task. Even if one is an experienced computer user and has a clear understanding of Boolean logic and the appropriate search terms, the time involved in crafting the search string may be undesirably long. For example, if a user wants to go on-line during a commercial break of an entertainment broadcast while sitting on a sofa to do some shopping, he might not want to type in a long search string and/or sort through a long list of hits.

Another time-consuming feature of using conventional methods is that, once a list of sites is returned, the next step is to connect to a selected site. Such connections can be time-consuming for a variety of reasons, and occasionally cannot be made because of system problems.

Thus, an Internet user interface that provided rapid access to desired information and that was intuitive for a casual user would be desirable. It would be further desirable if the user interface supplied the desired information with a reduced amount of undesired information.

SUMMARY OF THE INVENTION

Internet users are faced with too many returns ("hits") using conventional search tools, and finding the desired sites can be time-consuming and cumbersome. The problem is particularly troublesome for casual computer users who are not technically familiar with computer search techniques.

The present invention provides a user interface that displays a number of icons, each icon looking like and representing a building in a village. Selecting an icon returns a display of providers of goods or services, each of the providers being logically associated with the building represented by the icon. The providers are pre-selected, thus allowing rapid display of provider information without requiring accessing each provider's URL. Selecting a provider returns a display, commonly referred to as a "page", relating to the goods, services, or information available from that provider. Selecting a provider retrieves data from a local data storage location to generate a display of information related to the provider. The data storage location may thus store information sufficient to create pages for many or all of the providers associated with an icon, without needing to access a URL of any provider. Thus, the user interface serves as a virtual island or town, where goods or services can be obtained by a user without hopping from one URL to the next. In a particular embodiment, the user interface sends order information to the providers when a user is finished selecting goods and services. At this point, the user interface may address the providers' URLs.

In a further embodiment, the URLs of the providers are accessed by the user interface software in a background operation to retrieve data from the provider's site that is loaded into the local data storage location. This data retrieval may be performed according to a request from the user interface or according to signal from the service provider indicating that current data is available to replace previously stored data.

BRIEF DESCRIPTION OF THE DRAWINGS

FIG. 1 is a simplified table illustrating products and services associated with types of buildings according to one embodiment of the present invention;

FIG. 2 is a simplified diagram of an electronic information and marketing system;

DESCRIPTION OF SPECIFIC EMBODIMENTS

Figure 3:
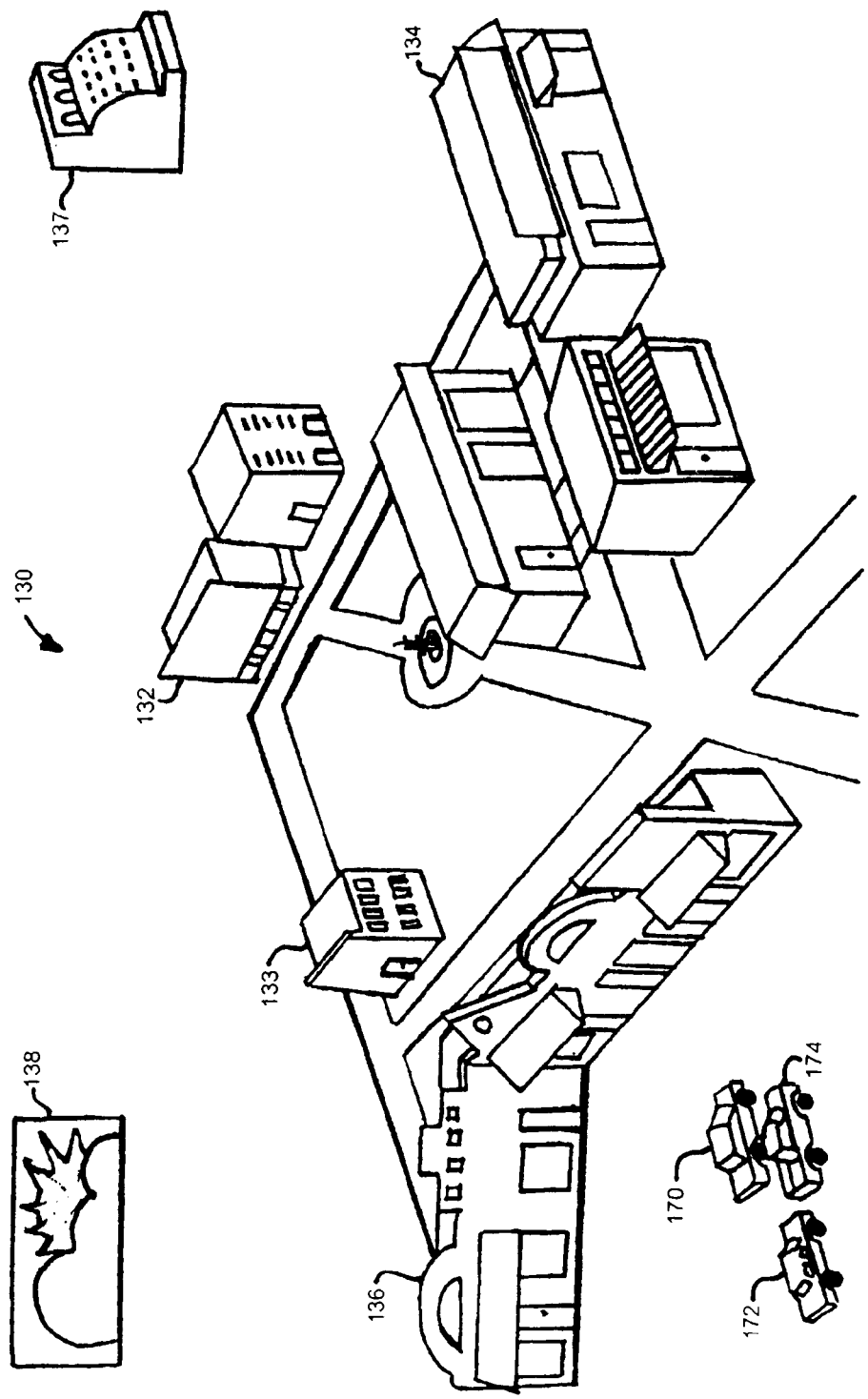
FIG. 3 is a simplified depiction of an image to be displayed on an electronic display according to a module of the computer program.

The present invention provides a graphical user interface ("GUI") for Internet applications, through a computer program product, that present the user with a collection of icons, each icon representing a building. The collection of building icons is arranged to represent a town (a "village map"), and generally includes buildings that one might expect to find in most towns, i.e. a comprehensive selection of goods and services. An exemplary table of building types and associated provider sites is provided in FIG. 1. When the user selects a building, a list, tile platter, second-level icon screen or similar page displays a number of selected provider sites logically related to the functions generally associated with the building represented by the icon. A provider is, for example, a retail sales entity, a financial service entity, a database host, or the like.

The providers associated with each icon are initially selected for the user by a village planner and programmed into the computer program. A provider may be associated with more than one icon. In a further embodiment, the user may move or copy provider pages from one icon to another, or may select additional providers to be associated with an icon, including via accessing a provider's URL. In another further embodiment, text is presented associated with a building icon, such as a storefront sign or banner.

In a further embodiment, the user has a common "shopping cart" with which to visit one or more provider sites, including sites at different buildings. The user can add items to his cart until he or she is done shopping. A single command submits all orders and provides the user's pre-verified payment and shipping information to all providers from whom goods or services have been selected.

FIG. 2 is a simplified representation of an electronic information system 100 according to one embodiment of the present invention. A user 102 with a user input device 104 selects icons or other fields (not shown) displayed on a display 106. The display may be a cathode-ray tube ("CRT"), flat-panel display, or similar device for example. In a particular embodiment, the display is part of a television entertainment system. The user input device can be a remote control transmitting data to the information system via infrared pulses or a computer "mouse", for example.

Video programming is provided to the display via a cable 108 with sufficient bandwidth to provide a video signal in addition to access to a digital data network, such as through an Internet service provider ("ISP"). Often a cable network company will also operate as an ISP. Typically, the cable provides a number of video channels and a digital data line. The cable 108 is connected to a "set-top box" 110, so-called because it often sits on top of a television set, that de-multiplexes the data line from the video signals, and typically routes the video signal(s) to the television tuner 112.

The set-top box 110 contains a microprocessor 114 and a computer-readable memory 116, such as read-only memory, random-access memory, flash memory, disk memory, or the like, possibly including a combination of memory types. The memory 116 contains a computer-readable program 118 that configures the set-top box or other electronic device, such as a network computer or a personal computer, into a particular machine. Prior to loading the program 118 into the memory 116, the program may reside on a magnetic or optical disk or a diskette or other computer-readable storage medium (not shown) that can be provided as a computer program product.

The program contains lines of code that, when executed by operation of the microprocessor, timer, calendar, and/or user input, cause the electronic system to operate in a particular fashion, thus configuring the general electronic system into a specific apparatus. Such programs can be arranged as sets of instructions, or modules. A module might, for example, store the data needed to generate a display page, store user-specific date, to automatically transfer data from one system component to another, execute input commands from the user, or to go to another module. In a particular embodiment, the computer program provides a user interface shell allowing rapid and convenient on-line shopping.

FIG. 3 is a simplified view of an image of a village 130 as the image might appear on the display created according to instructions in the computer-readable program stored in memory. The image may further include a tool bar of a network access program, for example, which is not shown for purposes of clarity. The image includes a plurality of icons representing buildings, such as travel agency 132, a hardware store 134, and a mall 136, among others. In addition to icons depicting buildings, additional icons are presented, such as an icon depicting clouds and the sun 138, representing a weather report and forecast service provider.

A user-movable cursor 140 is provided in the image. The user moves the cursor about the village with the user-input device, as is commonly known. When the cursor is moved to a selected building or other icon, the user activates computer-readable instructions by "clicking" (actuating an electronic switch on the user input device that is coupled to the system processor) on that icon. For purposes of this discussion, clicking might include single or double actuation of the switch, and generally refers to the user inputting a selection identified by the position of the cursor on the display. Clicking on an icon causes the user interface to run a set of instructions stored in memory. The retrieval and execution of a program module to generate another page or access a site is commonly known as "linking". Thus the icon serves as a link from the current page to a subsequent page. The subsequent page is often referred to as a "lower" page for purposes of illustration. Lower pages typically have links back to the previous page, or the original page, such as the village map. It is understood that visual representations other than icons can be used as a link, and that the term "icon" is used for convenience of illustration.

Figure 4:
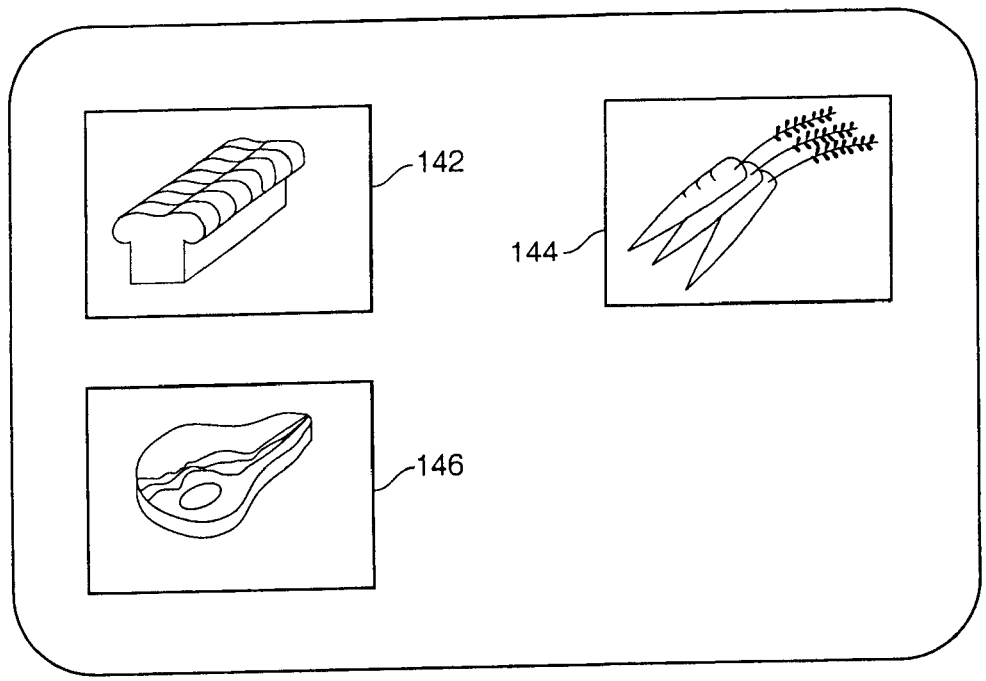
FIG. 4 is a simplified depiction of an image created by another module in the computer program activated by selection of a link in FIG. 3.

FIG. 4 is a simplified representation of an example of a second image generated according to a set of instructions of the computer-readable program stored in memory activated by clicking on the grocery store icon (reference numeral 135 in FIG. 3). An arrangement of images or list of categories of items that are available is presented, such as baked goods 142, produce 144, and meat 146. Clicking on one of these categories causes another set of computer instructions to run that provides further selections, if necessary. In a further embodiment, multiples of a category are provided, such as providing a number of different butcher shops or bakeries. In other embodiments, the second image is an arrangement of graphic "tiles", staggered, windowed, etc., each tile having an image associated with particular goods, such as a loaf of bread for baked goods, a head of lettuce for produce, or a steak for meat. Thus, a user can navigate the interface with minimal, if any, reading of text. In a particular embodiment, no text other than numbers associated with costs is presented, allowing even illiterate users to avail themselves of on-line shopping, and certainly facilitates on-line shopping for non-typists or users, such as user 102 in FIG. 2, who do not have access to a typewriter-style keyboard.

A graphics-based, rather than text-intensive, interface allows a casual user, such as a television viewer sitting several meters from the display, to operate the system through the interface. Such a user might find a text-based interface difficult to use for several reasons, such as display resolution and visual acuity. Similarly, it may be difficult or unreasonable for some users to type in requests, as often are needed to operate conventional Internet user interfaces.

Figure 5:
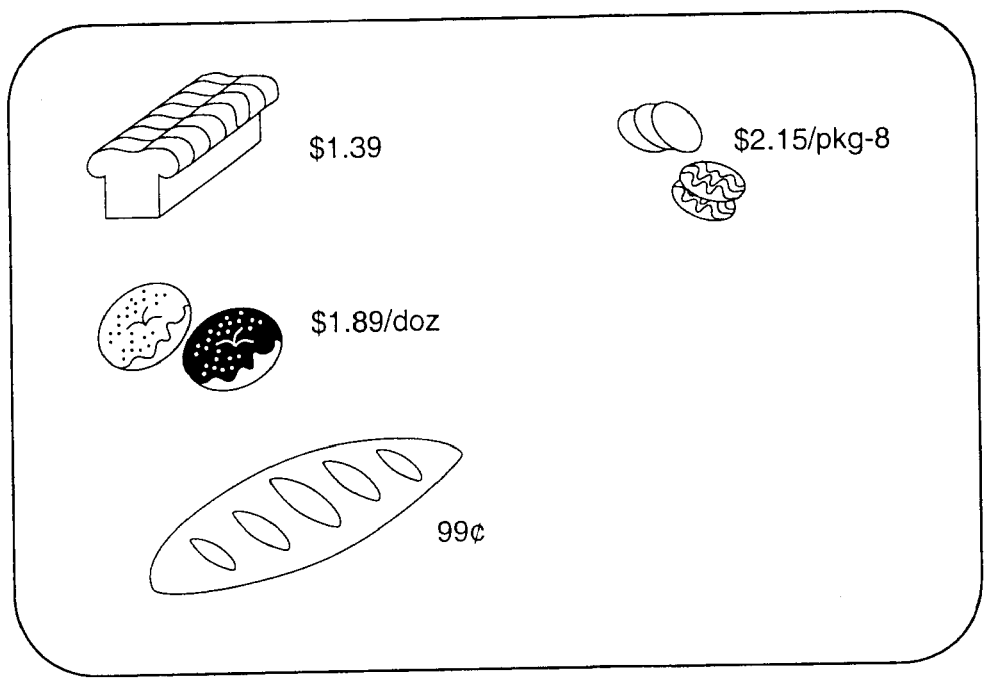
FIG. 5 is a simplified depiction of an image created by another module of the computer program activated by selection of a link in FIG. 4.

FIG. 5 is a simplified representation of an example of a third image generated when a category is selected from the image generated in FIG. 4. For example, the category "baked goods" was selected from the prior image (FIG. 4), which links to the image shown in FIG. 5. The current image displays a variety of baked goods and their price. The user can then select the desired goods using the user input device (i.e. the cursor and button switch), and add the goods to a virtual "shopping cart".

Such tasks using conventional search engines typically require substantial two-way data transfer between the user and the service supplier because the web site of each supplier is typically addressed and connected when the user selects the web site. The present invention addresses this problem in a number of ways. First, the village map software product stores pre-selected pages from service providers in a local memory. The local memory might be located at the user, i.e. set-top box, desktop personal computer, etc., or at a data-services provider, such as a domain name host server. Thus, when a product or service icon is selected, a page is loaded directly from this local memory, rather than having to connect to a provider's web site and download the provider's standard web page.

Additionally, the pre-selected page stored in local memory may be customized to reduce the associated file size, improve identification of the desired goods or services, or otherwise optimize the page for an intended purpose. For example, the intended purpose (of the user) might be to quickly and easily purchase a particular type of product on-line. The purchase of a simple get-well arrangement of flowers through a conventional Internet shopping interface is provided as a comparative example. Furthermore, in an embodiment of the present invention, a provider can change its page stored in local memory to reflect changes in price, availability, product line, or even special offers for users of the village map user interface. A feature of the page in local memory is that it can reflect different goods and prices, for example, than the provider's standard (Internet) web page. Such differentiation is desirable for a number of reasons, including reduced cost-of-sales resulting from use of the village map user interface, and/or consumer (user) selection and pre-approval, for example.

If the user enters the URL for CITYSEARCH.COM™, for example, he is eventually presented with a home-page. From that page, he can select a geographical location, such as San Francisco, which returns a page adapted to the San Francisco Bay Area. From that page the user selects "Shops and Services", which returns a page listing a variety of products and services and selected graphical icons. In this case, an icon labeled "Buy Flowers Online" is included on the page. Selecting this icon returns a page directed to a florist's shop. From this page, the user selects "Online Store" and a page is presented that at least depicts a floral arrangement, perhaps not the type desired, with an associated price; however, selecting "Get Well" returns yet another page that requires the user to select "$50 and Up" or "Under $50". Selecting "Under $50" returns a page that finally presents the user with a number of images of flower arrangements with prices under $50. Thus, to get to the page that contains a selection of products that the user is interested in buying requires seven levels of pages.

Furthermore, most conventional pages contain collateral information not directly related to the purchase transaction the user desires to complete. This collateral information ranges from "push" advertising for products including vehicles, sports' gloves, ticket sales, and job placement services to mission statements and textual greetings. Such information is appreciated in some situations, but serves to detract from the desired information and limit the area of the image that is devoted to the desired task, namely purchasing a particular product or service. These pages are only given as an example of one approach to on-line shopping. Other pages and user interfaces provide similar examples. Of particular note is the wide variety of unrelated goods and services typically presented on each of several layers of the pages of conventional on-line shopping interfaces.

The present invention addresses at least some of these issues in a variety of ways. First, collateral information is kept to a minimum, so that the user is presented primarily with information he "pulls". Second, pages are stored in a local memory, rather than being loaded from a provider's separate web site. If necessary, a provider may periodically update its page with current information, such as price and availability, which can be done in a background mode, independent of whether the user has accessed that page. Page updating might be done to a single local memory site, such as at a domain name host's site, or might be broadcast to a number of local memories, such as disk drives associated with the user's set-top box or personal computer. A background mode establishes a data-transfer protocol when the user is not transmitting or receiving other data, such as when he is viewing a page, and transfers data in a manner that does not immediately disrupt the user's activities on the system, or may transfer data to the domain name host, for example, in a fashion that is transparent to users. When the user selects an icon that requests a page, that page is loaded from local memory, rather than requiring an Internet connection to be made to the provider's web site. The user interface may operate in a variety of user-selected language environments, such as Japanese, English, or Spanish; however, the graphics-based building icons allow a user to operate at least a portion of the user interface without having to read. The combination of a universal graphic interface with a selected language allows the user interface to be adapted to a variety of communities (e.g. language-specific communities) while retaining a common layout and operational structure.

In a further embodiment, the digital size of the file creating the page is limited to a maximum, such as 1,400 kilo-bytes, preferably less than 700 kilo-bytes, to insure that each page will load to the user's local electronic device and display within a specified maximum period of time. Limited file size is achieved by designing the local page in a manner to avoid memory-intensive features. For example, there are no "moving" elements on the page, such as flames or waving flags, and line-art drawings, rather than photographs, may be used. As discussed above, collateral information, such as secondary push advertising, is limited as well. While the absolute time it takes to display a page on the user's display depends on many factors, such as the user's data transfer rate and local processing speed, keeping the page files within a maximum size insures that no page will take unduly long to load, thus aggravating the user with an unexpected delay.

Additionally, the lower-level page associated with an icon maintains a logical grouping of goods and services associated with that icon. For example, selecting the bank 133 shown in FIG. 3 returns a page showing icons or other links to pages associated with banking, financial planning, stock brokering, loan companies, insurance companies, and stock market information services, as shown in FIG. 1. It does not return links to pages related, for example, to daily specials at the green grocer or free e-mail. Limiting the types and number of links on the upper-level page to those logically related to the icon provides a user with more desired information because more area of the page remains available. This in turn allows the user to reach his ultimate site in fewer levels, hence less time.

Figure 6:
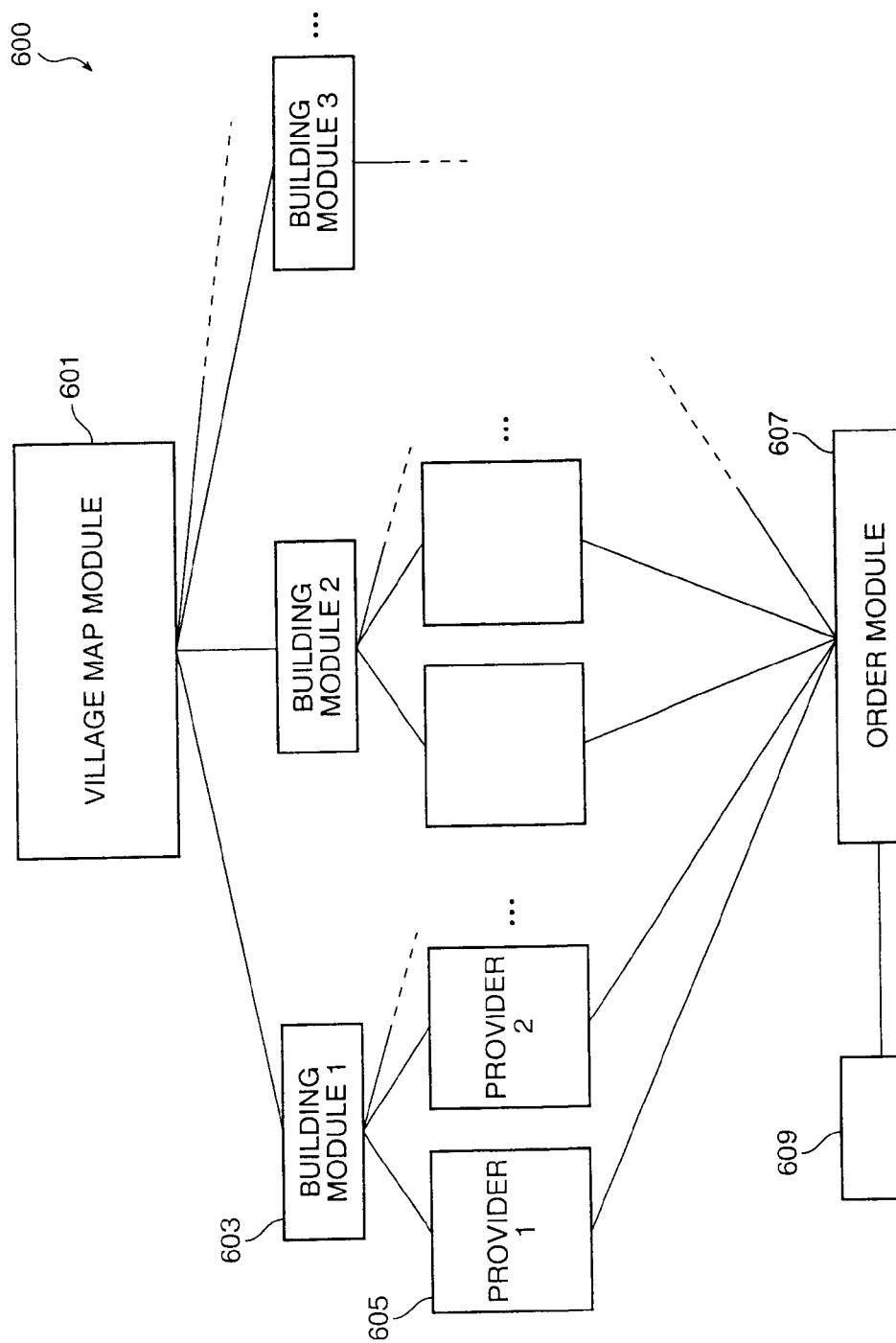
FIG. 6 is a simplified diagram of a control structure of a computer program according to an embodiment of the present invention.

FIG. 6 is a simplified diagram of a computer program structure 600 according to an embodiment of the present invention. A display of a village map is provided as a default, or is selected in response to user input, according to a top page subroutine 601, or module. The top page subroutine includes computer-readable instructions for generating the village map, as well as computer-readable instructions responsive to user input, both stored in memory. Using the user input device, the user then selects an icon on the village map, which activates a first icon subroutine 603. The first icon subroutine includes programming for generating a second page display, which typically includes icons or other links to specific providers of goods or services. When the user selects a link, a provider module 605 is activated. The provider module, among other functions, creates a display page relating to the goods or services available from the provider, including price information, for example. The provider module typically includes coded instructions for automatically linking to an ordering module 607 when a product or service is selected from the provider display. As shown, the ordering module is linked to several provider modules so that orders from a variety of providers may be accumulated in a memory buffer 609 managed by instructions in the ordering module or elsewhere in the user interface program. The ordering module may store, among other data, the products ordered by the user, the price of the product, obtained from the provider module, and the network address for placing an order with a provider. Additionally, the ordering module may store or access consumer information relating to the user, such as credit account number, credit limit, and shipping address. Those skilled in the art will appreciate that each module does not have to be a contiguous sequence of lines of code, and that the function of each module can be further divided into sub-modules, and that such sub-modules do not need to be proximate to each other in a code sequence listing.

Figure 7:
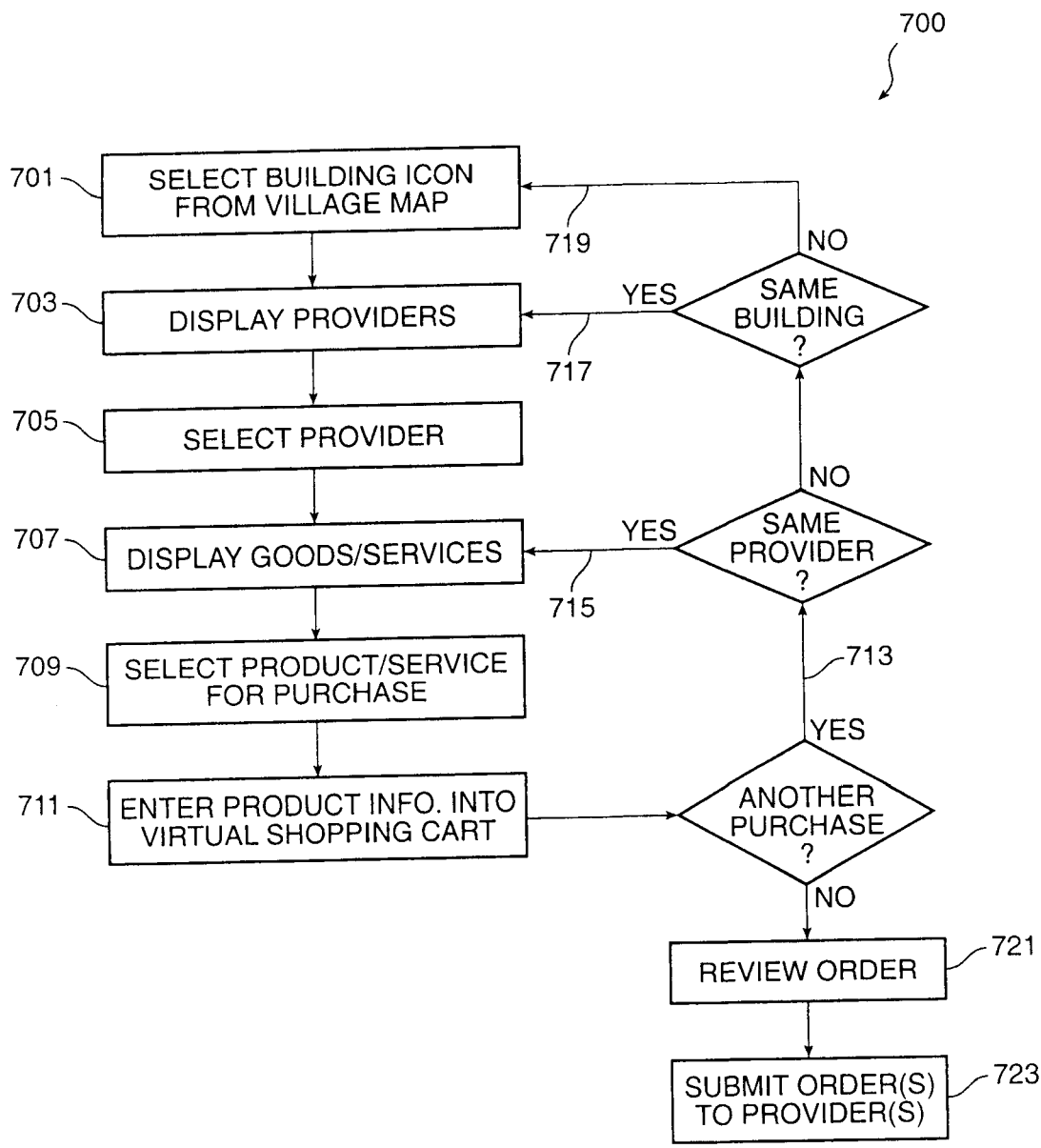
FIG. 7 is a simplified flow chart of a method for on-line selling according to an embodiment of the present invention.

FIG. 7 is a simplified flow chart of an on-line shopping process 700 according to the present invention. A user selects a building icon from a display of the village map (step 701). Selection of the building icon returns a display of providers or provider logically related to the selected building (step 703). The user then selects a provider (step 705) to view a display of the goods or services available from that provider (step 707). If the user decides to purchase a product or service, he can select the product or service (step 709), which enters the purchase into a virtual shopping cart (step 711). If the user wants to make additional purchases (step 713), he can return to that provider (step 715), or alternatively return to the providers associated with the building icon (step 717) or to the village map display (step 719) and continue purchasing until he is done shopping. Typically, the user has an opportunity to review and approve his order (step 721) before it is sent to the providers. If the order is ready, it is submitted to the appropriate provider(s) (step 723) by addressing the provider sites on the computer network.

One way that the information on a page remains focused is to pre-select the information that will be provided. In an embodiment of the present invention, providers are subscribers to an Internet marketing system. The Internet marketing system hosts custom or standard pages of the providers in exchange for a portion of sales made by the service provider through the Internet marketing system, and/or a membership fee. The hosted pages typically reside in local memory, but links to the other sites on the Internet are available through the Internet marketing system.

The Internet marketing system may provide other services to its providers/clients, such as centralized billing so that a user can make a variety of purchases on-line from a variety of providers and the Internet marketing system will collect and distribute the funds. The Internet marketing system can store consumer information on the user, such as a credit account number, a credit limit, billing address, and shipping address. This allows the Internet marketing service, for example, to give a number of providers the user's shipping address when the user orders products or services from those providers without the user needing to enter the information for each, or even a single, provider. In a further embodiment, the Internet marketing system operates as a bank between the provider and the user, directly paying the provider, thus improving cash flow and payment certainty for the provider, and assuming the responsibility of collecting payment from the user. In yet a further embodiment, the Internet marketing system provides consumer credit to the user.

An aspect of pre-selecting providers is that it can limit the number of providers available to a user through the Internet marketing system. This has both advantages, as discussed above, and disadvantages, because the user may wish to obtain information from a site not included in the village map selection of providers. However, the present invention can provide the flexibility of Internet access while providing yet additional advantages over conventional search engines.

Referring again to FIG. 3, user-movable vehicles 170, 172, 174 are provided in the image. Each vehicle represents a third-party search engine, such as INFOSEEK™, ALTAVISTA™, GOTO™, YAHOO™, or similar program, and has a color or combination of colors (not shown) distinguishing each vehicle from the others. Moving a vehicle to a building icon or other product or service icon and clicking on that icon launches the search engine associated with the vehicle and loads a pre-selected search string. The pre-selected search string is originally provided as part of the program associated with the village map software. For example, moving a red car to the grocery store 135 and clicking on the grocery store would enter a search string into, for example, INFOSEEK™ designed to identify grocery delivery services. The user may change the search string before using the search engine in the conventional fashion. The user could typically return to the village map interface by backing up or closing a window, depending on architecture of the software and where the user went on the Internet. In a further embodiment, the color(s) associated with each vehicle is also commonly associated with the search engine activated by the vehicle.

In a further embodiment, an additional module including information stored in memory is associated with a provider, or for each of several providers. If the user wants to browse through a store, mall, or selected group or type of merchandise, for example, he can double click on an icon or field associated with the provider. This module allows the user additional interactive capability with a particular provider.

In yet a further embodiment, the module includes access to a shopping assistant specifically arranged for by the provider to support on-line shoppers. This assistant could be a virtual assistant, including a virtual assistant with artificial intelligence that automatically recognizes the user and recalls a user-specific set of information, or, in a preferred embodiment, is a live person in an interactive mode. The interactive mode could be a voice connection, for example, or a "chat" type text connection between the user and the shopping assistant. In yet a further embodiment, the shopping assistant is linked to the user's display. In particular, the module could include an on-line catalog that the user could browse through, the shopping assistant concurrently viewing a catalog page selected by the user.

While the above is a complete description of the present invention, other equivalent embodiments may be apparent to those skilled in the art. Furthermore, changes and substitutions may be made without departing from the spirit of the invention. For example, although a preferred embodiment has been described primarily in terms of a cable-television system, an alternative embodiment may feature an network computer or a desktop computer. Accordingly, the scope of the invention should not be limited to the foregoing description, but should defined by the following claims.

What is claimed is:

1. A computer program product for configuring a network computer system into an on-line shopping apparatus, the computer program product comprising:
   a computer-readable storage medium programmed with a computer program, the computer program having sets of instructions including:
      a first set of instructions for generating an image of a village on a display, the image having a plurality of discrete building icons, and for receiving user input to select one of the plurality of building icons, and a set of instructions for generating a vehicle icon superimposed on the village, the vehicle icon being movable with respect to the village in response to user input from a user input device, and further including instructions for accessing a computer network search engine with a pre-selected search string, the pre-selected search string being chosen according to a superposition of the vehicle icon on a selected building icon;
      a second set of instructions for generating an image of a provider on the display, the provider offering for sale a product logically associated with one of the building icons, the second set of instructions being executed according to user input selecting the one of the building icons and including instructions for receiving user input to select the provider;
      a third set of instructions for generating an image on the display of products offered for sale by the provider, the third set of instructions being activated according to user input selecting the provider, and instructions for receiving user input to select a product; and
      a fourth set of instructions executed in response to a user selection of a product, the fourth set of instructions including commands to order the product from the provider.

2. The computer program product of claim 1 wherein the first set of instructions includes a set of instructions for displaying a plurality of vehicle icons, each of the plurality of vehicle icons being associated with each of a plurality of search engines.

3. The computer program product of claim 2 wherein the pre-selected search string is chosen according to the search engine associated with the vehicle icon as well as according to the superposition of the vehicle icon on the selected building icon.

4. A computer program product for configuring a network computer system into an on-line shopping apparatus, the computer program product comprising:
   a computer-readable storage medium programmed with a computer program, the computer program having sets of instructions including:
      a first set of instructions for generating an image a village having a plurality of discrete building icons on a display, generating a plurality of movable vehicle icons, moving a selected one of the vehicle icons in response to a first user input, and receiving a second user input to select one of the plurality of building icons, wherein each of the plurality of movable vehicle icons is associated with each of a plurality of computer network search engines and wherein moving a selected movable vehicle icon to a selected building icon accesses the search engine associated with the movable vehicle icon and provides a pre-selected search string to the search engine, the pre-selected search string being chosen according to the selected movable vehicle icon and the selected building icon;
      a second set of instructions for generating an image of a provider on the display, the provider offering for sale a product logically associated with one of the building icons, the second set of instructions being executed according to user input selecting the one of the building icons;
      a third set of instructions stored in a local memory for generating an image on the display of products offered for sale by the provider and for accepting current data from the provider via a computer network, the third set of instructions being activated according to user input selecting the provider, the third set of instructions being stored in less than 1,500 bytes of the memory; and
      a fourth set of instructions executed in response to a user selection of a product, the fourth set of instructions including commands to order the product from the provider.

5. A method for selling products over a computer network, the method comprising:
   generating an image of a plurality of building icons on a display at a location of a consumer;
   accepting a first user input from the consumer to select a first building icon;
   generating an image on the display of a provider link of a first provider, the first provider being a subscriber to an on-line directory service and logically associated with the building icon;
   accepting a second user input from the consumer to select the provider link;
   generating a provider page from a local memory, the provider page including a graphical image of a first product available from the first provider, the graphical image being a product link to the first product;
   accepting a third user input from the consumer to select the product link; and
   submitting an order to the on-line directory service for the first product.

6. The method of claim 5 wherein, after the accepting a first user input step, the generating step includes generating an image of a plurality of provider links of a plurality of providers, each of the plurality of providers being logically associated with the building icon.

7. The method of claim 6 wherein a first provider provides a first product type and a second provider provides a second product type, the first product type being different from the second product type.

8. The method of claim 6 wherein a first provider provides a first product type and the second provider provides the first product type.

9. The method of claim 5 wherein the provider is selected for display according to the location of the consumer.

10. The method of claim 5 further including steps, prior to the step of submitting an order, of
   generating an image on the display of a second provider link of a second product, the second product being different from the first product;
   accepting a fourth user input from the consumer to select the second provider link;

generating a second provider page from the local memory, the provider page displaying a second product link to the second product;

accepting a fifth user input from the consumer to select the second product link, wherein
the submitting step further includes submitting a second order to the on-line directory service for the second product.

11. A method for selling products over a computer network, the method comprising:

generating an image of a plurality of building icons on a display at a location of a consumer;

accepting a first user input from the consumer to select a first building icon;

generating an image on the display of a plurality of provider links, a first provider link being associated with a first provider of a first product and a second provider link being associated with a second provider of a second product, the first product being different from the second product, the first provider and the second provider each being a pre-selected subscriber to an on-line directory service and logically associated with the building icon, wherein at least one of the plurality of provider links is selected for display according to the location of the consumer;

accepting a second user input from the consumer to select the first provider link;

generating a first provider page from a local memory, the first provider page including a first graphical image of the first product, the first graphical image being a first product link to the first product;

accepting a third user input from the consumer to select the first product link;

accepting a fourth user input from the consumer to select the second provider link;

generating a second provider page from the local memory, the second provider page including a second graphical image of the second product, the second graphical image being a second product link to the second product;

accepting a fifth user input from the consumer to select the second product link; and submitting a first order to the first provider for the first product and essentially concurrently submitting a second order to the second provider for the second product.

* * * * *